US010747092B2

(12) United States Patent
Jobi et al.

(10) Patent No.: US 10,747,092 B2
(45) Date of Patent: Aug. 18, 2020

(54) ELECTRONIC DEVICE HAVING A RING SHAPED PACKING, AND A LIGHT SOURCE UNIT AND PROJECTOR INCLUDING THE ELECTRONIC DEVICE

(71) Applicant: CASIO COMPUTER CO., LTD, Tokyo (JP)

(72) Inventors: Osamu Jobi, Hachioji (JP); Tomoyuki Ueda, Hamura (JP)

(73) Assignee: CASIO COMPUTER CO., LTD, Tokyo (JP)

(*) Notice: Subject to any disclaimer, the term of this patent is extended or adjusted under 35 U.S.C. 154(b) by 0 days.

(21) Appl. No.: 16/052,884

(22) Filed: Aug. 2, 2018

(65) Prior Publication Data

US 2019/0086782 A1 Mar. 21, 2019

(30) Foreign Application Priority Data

Sep. 19, 2017 (JP) .................................. 2017-179290

(51) Int. Cl.
*G03B 21/20* (2006.01)
*G03B 21/14* (2006.01)
*G03B 21/16* (2006.01)

(52) U.S. Cl.
CPC .......... *G03B 21/20* (2013.01); *G03B 21/145* (2013.01); *G03B 21/16* (2013.01)

(58) Field of Classification Search
CPC ... G03B 21/2093; G03B 21/145; G03B 21/16
See application file for complete search history.

(56) References Cited

U.S. PATENT DOCUMENTS

2015/0277112 A1* 10/2015 Koyama ............ G02B 27/0006
   349/9
2016/0273753 A1*  9/2016 Inoue ................ G03B 21/2033

FOREIGN PATENT DOCUMENTS

| JP | 57-032256 U1 | 2/1982 |
| JP | 2006-147744 A | 6/2006 |
| JP | 2012-208205 A | 10/2012 |
| JP | 2014-26769 A | 2/2014 |
| JP | 2016-177162 A | 10/2016 |

OTHER PUBLICATIONS

Translation of JP 2014-026769 A. (Year: 2014).*
JPO; Application No. 2017-179290; Notice of Reasons for Refusal dated Aug. 22, 2019.

* cited by examiner

*Primary Examiner* — Michelle M Iacoletti
*Assistant Examiner* — Magda Cruz
(74) *Attorney, Agent, or Firm* — Fitch, Even, Tabin & Flannery LLP (57) ABSTRACT

An electronic device according to embodiments of the invention include a fixing target member, a fixing portion having formed thereon a frame portion that is erected around a circumference of the fixing target member, a packing having a groove and disposed between the frame portion and the fixing target member, a core member disposed in the groove, and a pressing member that presses the core member towards the packing.

14 Claims, 9 Drawing Sheets

ELECTRONIC DEVICE HAVING A RING SHAPED PACKING, AND A LIGHT SOURCE UNIT AND PROJECTOR INCLUDING THE ELECTRONIC DEVICE

CROSS-REFERENCE TO RELATED APPLICATION

This application is based upon and claims the benefit of priority under 35 USC 119 from the prior Japanese Patent Application No. 2017-179290 filed on Sep. 19, 2017, the entire disclosure of which, including the description, claims, drawings and abstract, is incorporated herein by reference.

BACKGROUND OF THE INVENTION

Field of the Invention

The present invention relates to an electronic device, a light source unit, and a projector.

Description of the Related Art

Data projectors are widely used on many occasions in these days as an image projection system for projecting a screen of a personal computer and a video screen, as well as images based on image data recorded on a memory card or the like. In these data projectors, light emitted from a light source is collected on to a micromirror display device called a digital micromirror device (DMD) or a liquid crystal panel to display a color image on a screen.

Projectors have been expanding their applications from a presentation on a commercial scene to a home use as video equipment such as personal computers and DVD players have been propagating. Conventionally, in the mainstream of these projectors, high-intensity discharge lamps have been used as a light source. In recent years, however, various types of projectors have been developed which include, as a light source, a solid-state light emitting device such as a laser diode, or a luminescent plate that uses the solid-state light emitting device as an excitation light source.

In some of these projectors, a configuration is adopted in which a laser diode for emitting light is mounted in an interior portion of a case that makes up a light source unit from outside. For example, Japanese Unexamined Patent Publication No. 2016-177162 (JP-A-2016-177162) discloses a light source unit that includes a heat dissipating unit and a holder that holds a plurality of blue laser diodes that are semiconductor light emitting devices. The heat dissipating unit is disposed so as to be in contact with a surface on an opposite side to a side where the blue laser diodes are disposed.

In recent years, projectors are used in an environment where a dust-proof property is required. To meet this requirement, it is desirable that a light source unit has a hermetically closed construction. In particular, when laser diodes or LEDs are used, once dust enters an optical path, a phenomenon is caused in which the luminance of the laser diodes or LEDs is reduced by the dust. To prevent the occurrence of such a phenomenon, a technique is necessary of tightly closing a gap in the light source unit.

In the light source unit disclosed in JP-A-2016-177162, however, no specific sealing construction is provided for sealing the holder from the side where the heat dissipating unit is disposed to the side where the blue laser diodes are disposed. Due to this, it is assumed that foreign matters such as dust flow into an interior portion of a case where optic members are disposed. When foreign matters adhere to the optic members, guiding of light within the light source unit is disturbed, as a result of which the quality of light emitted by the light source unit is deteriorated.

On the other hand, when the optic members are caused to deviate from their designed positions, their optical properties are deteriorated. To avoid this problem, the optic members need to be prevented from deviating from their designed positions when a dust-proof sealing member is disposed between a case and a fixing target member.

SUMMARY OF THE INVENTION

The invention has been made in view of these situations, and an object thereof is to provide an electronic device that improves its dust-proof performance while reducing a risk of a fixing target member of deviating from its designed position, a light source unit, and a projector.

According to an aspect of the invention, there is provided an electronic device including a fixing target member, a fixing portion having formed thereon a frame portion that is erected around a circumference of the fixing target member, a packing having a groove and configured to be disposed between the frame portion and the fixing target member, a core member configured to be disposed in the groove, and a pressing member configured to press the core member towards the packing.

According to another aspect of the invention, there is provided a light source unit including the electronic device described above, wherein the fixing portion is provided in a light source case in which an opening portion is formed in a fixing position, wherein the fixing target member is a holder that holds a light source, and wherein the pressing member is a heat sink for the holder that is brought into abutment with the holder while pressing the core member.

According to a further aspect of the invention, there is provided a projector including the light source unit described above, a display device on to which light source light from the light source unit is shined to form image light, a projection-side optical system configured to project the image light emitted from the display device on to a screen, and a projector control unit configured to control the display device and the light source unit.

BRIEF DESCRIPTION OF THE PREFERRED SEVERAL VIEWS OF THE DRAWINGS

DETAILED DESCRIPTION OF THE PREFERRED EMBODIMENTS

First Embodiment

Figure 1:
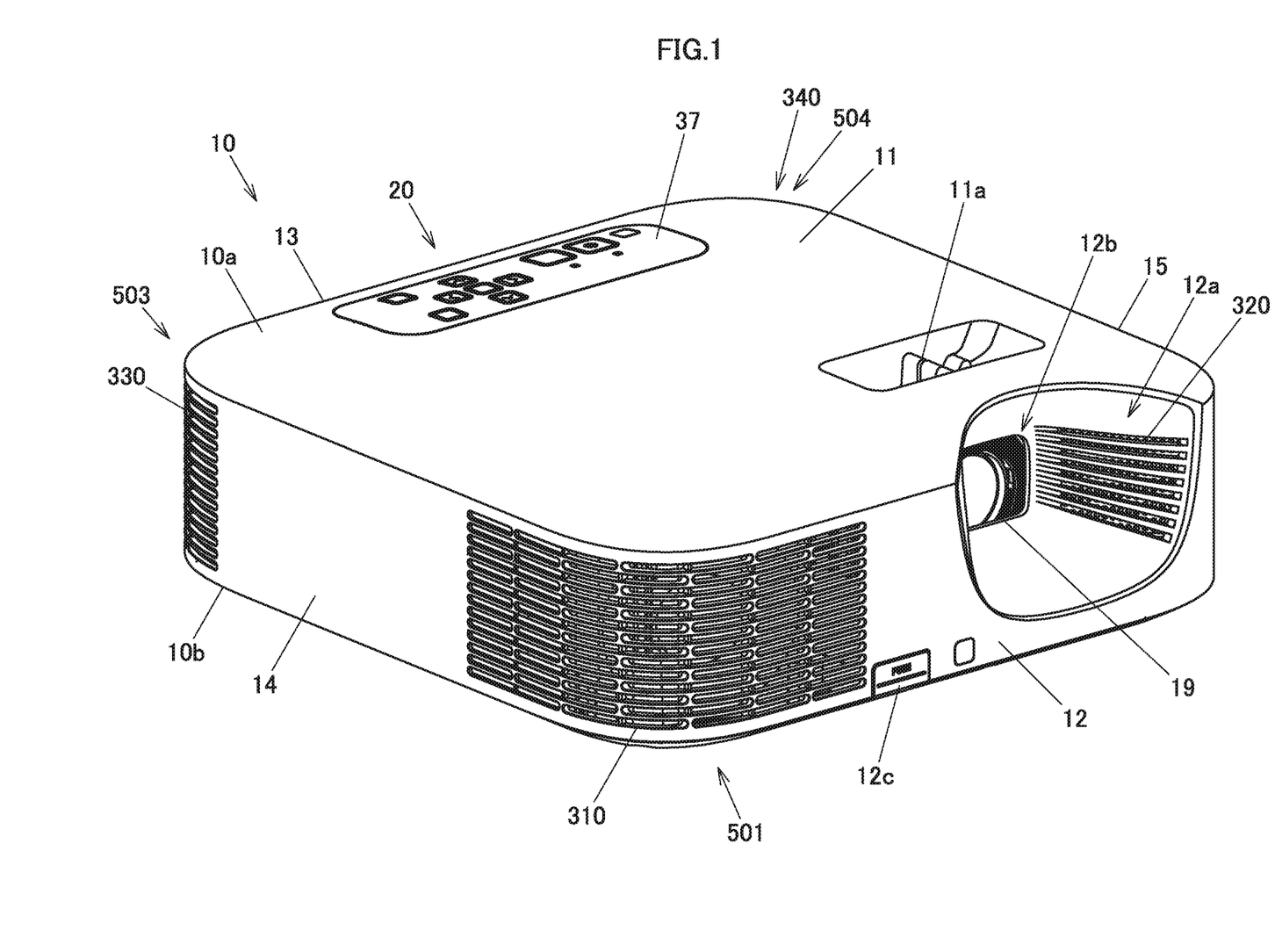
FIG. 1 is an external perspective view of a projector according to a first embodiment of the invention.

Hereinafter, a mode for carrying out the invention will be described. FIG. 1 is an external perspective view of a projector 10. The projector 10 of the embodiment includes an upper main body case 10a and a lower main body case 10b. A front panel 12, a back panel 13, a right panel 14 and a left panel 15 that constitute side panels of a casing of the projector 10 are erected downwards from an outer circumferential edge of the upper main body case 10a. Lower ends of the panels 12 to 15 come into abutment with an outer circumferential edge of the lower main body case 10b. Consequently, the projector 10 is formed into a substantially rectangular parallelepiped shape. In description of this embodiment, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

A keys/indicators unit 37 and a projection image control unit 11a are provided on an upper panel 11 of the casing of the projector 10. Disposed on this keys/indicators unit 37 are keys and indicators including a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat. The projection image control unit 11a includes one or a plurality of rotary knobs. Operating this rotary knob controls the position of a movable lens of a projection-side optical system, which will be described later by reference to FIG. 4, to thereby control the size and focus of an image to be projected. Although not shown, the projector 10 includes an Ir reception unit configured to receive a control signal from a remote controller.

Outside air inlet holes 310 are provided in a front-right corner portion 501 defined by the front panel 12 and the right panel 14. A light emitting portion 12a, which is depressed into a mortar-like configuration, is provided to the left of the front panel 12. Outside air inlet holes 320 are formed in an inner wall of the light emitting portion 12a that lies on a side of the left panel 15. The projector 10 has the light emitting portion 12a, a projection port 12b and a lens cover 19 that covers the projection port 12b.

A height control button 12c is provided at a lower end of the front panel 12. The projector 10 has a supporting leg inside the front panel 12. In the projector 10, the supporting leg can be controlled to appear from or disappear into the projector 10 while the height control button 12c is kept pressed down. Thus, the user operates the height control button 12c and fixes an amount of protrusion of the supporting leg to control the height or inclination of the projector 10.

Various types of terminals 20 including a USB terminal, a video signal input D-SUB terminal, an S terminal, an RCA terminal and the like which are provided in input and output connector unit and a power supply adaptor plug and the like are provided on the back panel 13. Additionally, outside air inlet holes 330 are formed in a corner portion 503 defined between the back panel 13 and the right panel 14. Inside air outlet holes 340 are formed in a corner portion 504 defined between the back panel 13 and the left panel 15.

Figure 2:
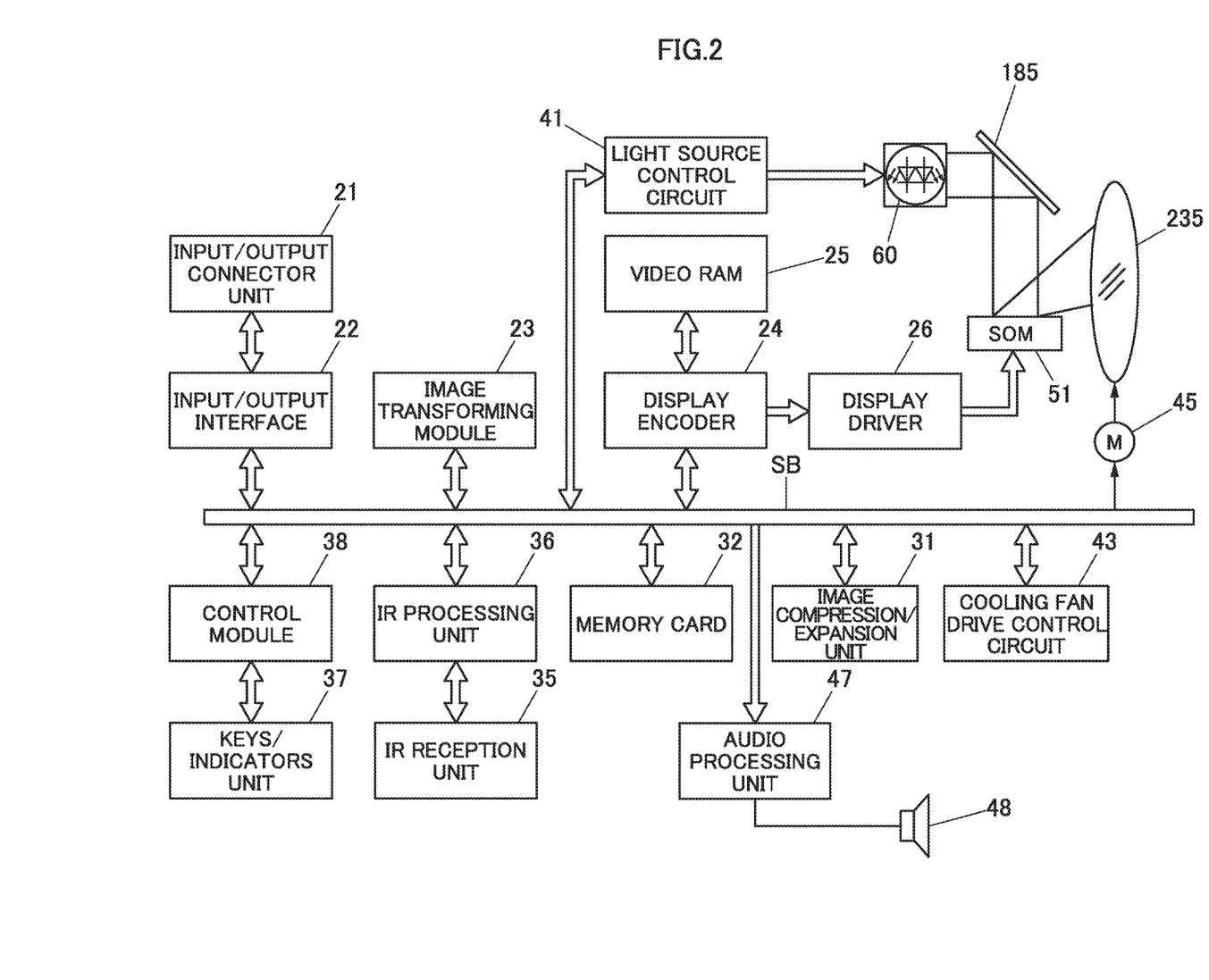
FIG. 2 is a block diagram illustrating functional circuit blocks of the projector according to the first embodiment of the invention.

Next, a projector control unit of the projector 10 will be described by the use of a functional circuit block diagram illustrated in FIG. 2. The projector control unit includes a control module 38, an input/output interface 22, an image transforming module 23, a display encoder 24, a display driver 26 and the like.

The control module 38 governs the control of respective operations of circuitries within the projector 10 and is made up of a CPU, a ROM that stores operation programs of various types of settings in a fixed fashion, a RAM that is used as a working memory and the like.

Image signals of various standards that are inputted from the input/output connector unit 21 are sent via the input/output interface 22 and a system bus (SB) to the image transforming module 23 where the image signals are transformed so as to be unified into an image signal of a predetermined format that is suitable for display by the projector control unit. Thereafter, the unified image signal is outputted to the display encoder 24.

The display encoder 24 deploys the inputted image signal on a video RAM 25 for storage therein and generates a video signal from the contents stored in the video RAM 25, outputting the video signal so generated to the display driver 26.

The display driver 26 drives a display device 51, which is a spatial optical modulator (SOM), at an appropriate frame rate in response to the image signal outputted from the display encoder 24.

The projector 10 shines a pencil of light emitted from a light source unit 60 on to the display device 51 by way of a light guiding optical system, which will be described later, whereby an optical image (an image) is formed by using reflected light reflected by the display device 51. The projector 10 projects the image so formed on to a screen for display thereon by way of the projection-side optical system, which will also be described later. A movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes, and the compressed data is sequentially written on a memory card 32 that constitutes a detachable recording medium.

With the projector 10 set in a reproducing mode, the image compression/expansion unit 31 reads out the image data recorded on the memory card 32 and expands the individual image data that make up a series of dynamic images frame by frame. Then, the image compression/expansion unit 31 outputs the image data to the display encoder 24 by way of the image transforming module 23 so as to enable the display of dynamic images based on the image data stored on the memory card 32.

Operation signals generated at the keys/indicators unit 37 that includes the main keys and indicators that are provided on the upper panel 11 of the casing are sent out directly to the control module 38. Key operation signals from the remote controller are received by the IR reception unit 35 and are then demodulated into a code signal at an IR processing unit 36 for output to the control module 38.

The control module 38 is connected to an audio processing unit 47 by way of the system bus (SB). This audio processing module 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control module 38 controls a light source control circuit 41 that is configured as a light source control module. The light source control circuit 41 controls separately the operation of an excitation light shining device of a green light source device and a red light source device of the light source unit 60 so that light of a predetermined wavelength range that is required in forming an image is emitted from the light source unit 60. The light of the predetermined wavelength range emitted from the light source unit 60 is reflected on a shining mirror 185 to be shined on to the display device 51.

The control module 38 causes a cooling fan drive control circuit 43 to detect temperatures through a plurality of temperature sensors which are provided in the light source unit 60 so as to control the revolution speeds of cooling fans based on the results of the temperature detections. Additionally, when receiving an instruction to switch off the power supply to the projector 10, the control module 38 can also cause the cooling fan drive control circuit 43 to keep the cooling fans rotating by use of a timer or the like even after the power supply to a main body of the projector 10 is switched off. Alternatively, the control module 38 can determine on a timing at which the power supply to the main body of the projector 10 is cut off depending upon the results of the temperature detections by the temperature sensors.

Figure 3:
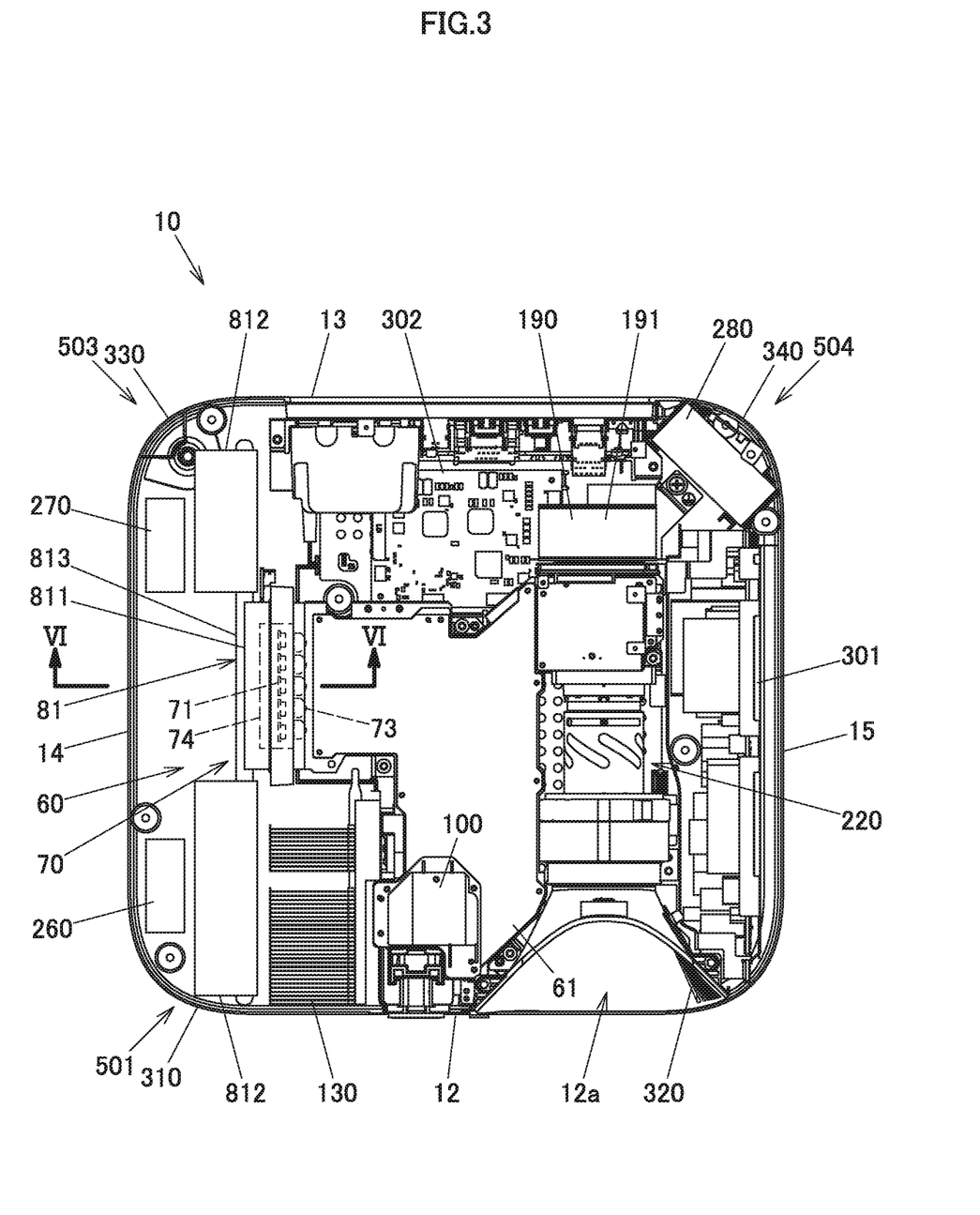
FIG. 3 is a schematic plan view illustrating an internal construction of the projector according to the first embodiment of the invention.

Next, an internal construction of the projector 10 will be described. FIG. 3 is a schematic plan view illustrating an internal construction of the projector 10. The projector 10 includes a power supply unit 301, a control circuit board 302 and the light source unit 60. Additionally, the projector 10 includes an outside air inlet fan, an outside air inlet fan 270 and an inside air outlet fan 280 as cooling fans.

The light source unit 60 is disposed substantially at a center of the casing of the projector 10. The light source unit 60 accommodates optical members such as light sources, lenses, mirrors and the like in an interior of a light source case 61. The light source unit 301 is disposed on a side of the light source unit 60 that lies near to the left panel 15. A substrate of the power supply unit 301 is disposed substantially parallel to the left panel 15. The control circuit board 302 is disposed on a side of the light source unit 60 that lies near to the back panel 13. The control circuit board 302 is disposed substantially perpendicular relative to an up-and-down direction. The control circuit board 302 includes a power supply circuit block, a light source control block and the like. Additionally, a plurality of control circuit boards 302 can be provided separately to correspond to different functions of the power supply block, the light source control block and the like.

Figure 4:
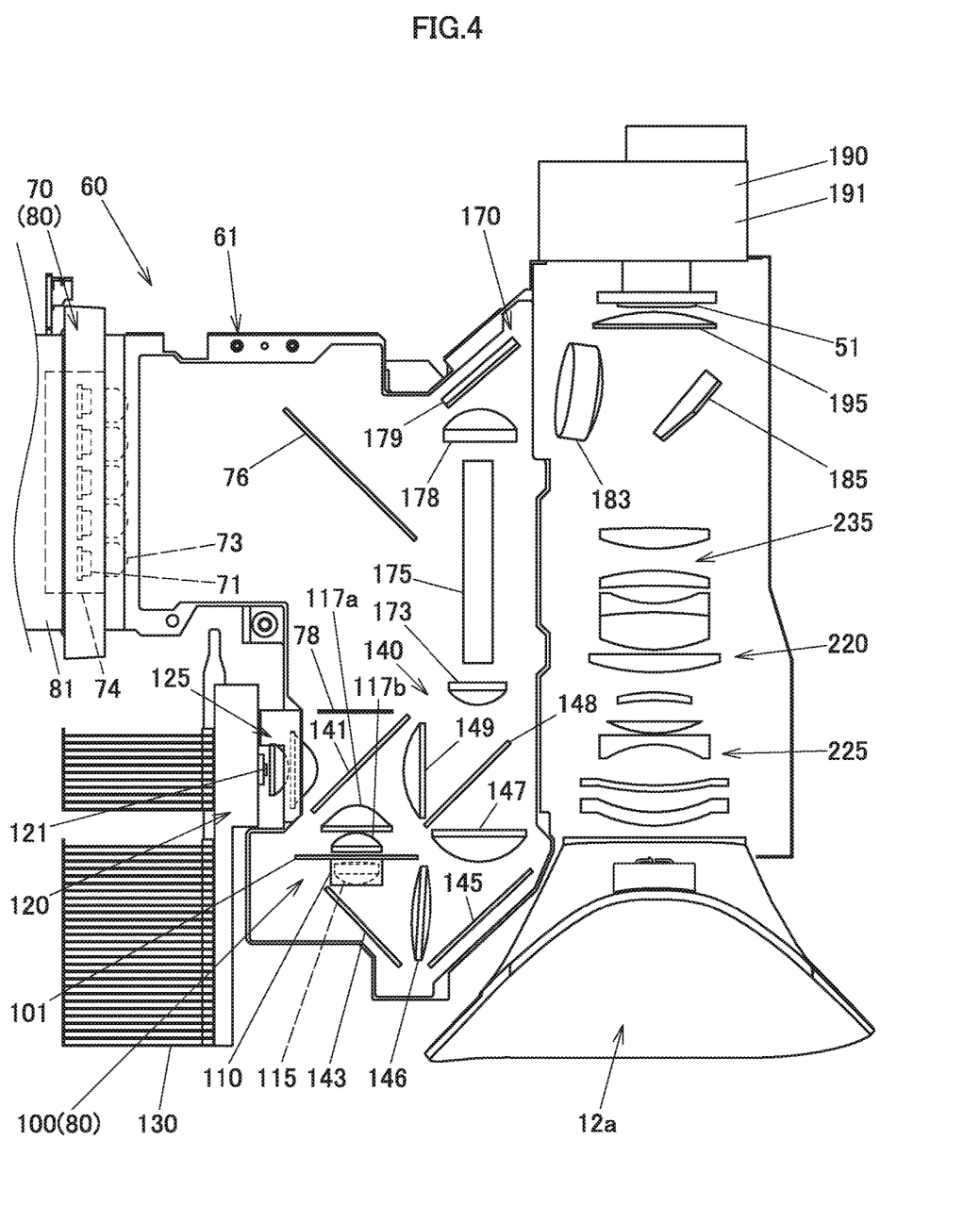
FIG. 4 is a schematic plan view of an interior portion of a light source case of a light source unit according to the first embodiment of the invention.

Here, an internal construction of the light source unit 60 will be described. FIG. 4 is a schematic plan view of the light source unit 60. The light source unit 60 includes a red light source device 120 that is a light source of light of a red wavelength band or range, a green light source device 80 that is a light source of light of a green wavelength band or range, and an excitation light shining device 70 that is not only a blue light source device that is a light source of light of a blue wavelength band or range but also an excitation light source. The green light source device 80 is made up of the excitation light shining device 70 and a luminescent plate device 100. The light source unit 60 has a light guiding optical system 140. The light guiding optical system 140 combines a pencil of light of the green wavelength range, a pencil of light of the blue wavelength range and a pencil of light of the red wavelength range together and then guides the pencils of light of the green, blue and red wavelength ranges to the same optical path.

The excitation light shining device 70 is disposed on a side of the casing of the projector 10 that lies near to the right panel 14. The excitation light shining device 70 includes a plurality of solid-state light emitting devices that are disposed so that optical axes thereof are parallel to the back panel 13. The solid-state light emitting devices of this embodiment are a plurality of blue laser diodes 71 that emit light of the blue wavelength range. The plurality of blue laser diodes 71 are disposed parallel to the right panel 14. These blue laser diodes 71 are fixed to a holder (a fixing target member) 74.

In addition, the excitation light shining device 70 includes a reflecting mirror 76, a diffusing plate 78, and a heat sink (a pressing member) 81. The reflecting mirror 76 turns an axis of light emitted from each of the blue laser diodes 71 through about 90 degrees towards the diffusing plate 78. The diffusing plate 78 diffuses light emitted from each of the blue laser diodes 71 and reflected on the reflecting mirror 76 at a predetermined diffusing angle. As shown in FIG. 3, the heat sink 81 is disposed between the blue laser diodes 71 and the right panel 14.

Returning to FIG. 4, collimator lenses 73 are disposed individually on optical paths of lights from the blue laser diodes 71, and the collimator lenses 73 enhance the directivity of lights emitted from the blue laser diodes 71 and transform them into parallel lights. These collimator lenses 73 are held on the holder 74 together with the blue laser diodes 71.

The red light source device 120 includes a red light source 121 that is disposed so that an optical axis thereof becomes parallel to pencils of light of the blue laser diodes 71 and a collective lens group 125 that collects light emitted from the red light source 121. This red light source 121 is a red light emitting diode that is a solid-state light emitting device emitting light of the red wavelength range. The red light source device 120 is disposed so that an axis of light of the red wavelength range emitted from the red light source device intersects an axis of light of the green wavelength range emitted from a luminescent plate 101. The red light source device 120 includes a heat sink 130 on a side of the red light source 121 that lies near to the right panel 14.

The luminescent plate device 100 that makes up the green light source device 80 includes the luminescent plate 101, a motor 110, collective lenses 117a, 117b on an incident side and a collective lens 115 on an emerging side. The luminescent plate 101 is a luminescent wheel that is disposed so as to intersect an axis of light emitted from the excitation light shining device 70 at right angles. This luminescent plate 101 is driven to rotate by the motor 110. The collective lenses 117a, 117b collect pencils of excitation light emitted from the excitation light shining device 70 on to the luminescent plate 101. The collective lens 115 collects pencils of light emitted from the luminescent plate 101 towards the front panel 12. The luminescent plate device 100 is disposed above the collective lenses 117a, 117b, 115. Due to this, part of a lower portion of the luminescent plate 101 is disposed on an optical path of light emitted from the collective lenses 117a, 117b, 115.

A luminous light emitting area and a diffuse transmission area are provided end to end in a circumferential direction on the luminescent plate 101. The luminous light emitting area receives light of the blue wavelength range emitted from the blue laser diodes 71 as excitation light to emit excited luminous light of the green wavelength range. The diffuse transmission area transmits light emitted from the blue laser diodes 71 while diffusing it. The diffuse light transmitted through the diffuse transmission area is emitted as light of the blue wavelength range of the light source unit 60.

The light guiding system 140 has a first dichroic mirror 141, a collective lens 149, a second dichroic mirror 148, a first reflecting mirror 143, a collective lens 146, a second reflecting mirror 145, and a collective lens 147. The first dichroic mirror 141 is disposed in a position where light of the blue wavelength range emitted from the excitation light shining device 70 and light of the green wavelength range emitted from the luminescent plate 101 intersect light of the red wavelength range emitted from the red light source device 120. The first dichroic mirror 141 transmits light of the blue wavelength range and light of the red wavelength range and reflects light of the green wavelength range. An axis of the light of the green wavelength range reflected by the first dichroic mirror 141 is turned through 90 degrees towards the left panel 15 so as to be directed towards the collective lens 149. Thus, an axis of the light of the red wavelength range that is transmitted through the first dichroic mirror 141 coincides with the axis of the light of the green wavelength range that is reflected by the first dichroic mirror 141.

The collective lens 149 is disposed on a side of the first dichroic mirror 141 that lies to be directed to the left panel 15. The light of the red wavelength range that is transmitted through the first dichroic mirror 141 and the light of the green wavelength range that is reflected by the first dichroic mirror 141 are both incident on the collective lens 149. The second dichroic mirror 148 is disposed on a side of the collective lens 149 that lies to be directed to the left panel 15 and a side of the collective lens 147 that lies to be directed to the back panel 13. The second dichroic mirror 148 reflects light of the red wavelength range and light of the green wavelength range and transmits light of the blue wavelength range. Thus, the light of the red wavelength range and the light of the green wavelength range that are collected by the collective lens 149 are reflected by the second dichroic mirror 148 to be turned through 90 degrees towards the back panel 13. A collective lens 173 is disposed on a side of the second dichroic mirror 148 that lies to be directed to the back panel 13. The light of the red wavelength range and the light of the green wavelength range that are reflected by the second dichroic mirror 148 are incident on the collective lens 173.

The first reflecting mirror 143 is disposed on an axis or optical path of the light of the blue wavelength range that is transmitted through the luminescent plate 101, that is, between the collective lens 115 and the front panel 12. The first reflecting mirror 143 reflects light of the blue wavelength range and turns an axis of the light of the blue wavelength range through 90 degrees towards the left panel 15. The collective lens 146 is disposed on a side of the first reflecting mirror 143 that lies to be directed to the left panel 15. The second reflecting mirror 145 is disposed on a side of the collective lens 146 that lies to be directed to the left panel 15. The second reflecting mirror 145 turns an axis of the light of the blue wavelength range that is reflected by the first reflecting mirror 143 and is collected by the collective lens 146 through 90 degrees towards the back panel 13. The collective lens 147 is disposed on a side of the second reflecting mirror 145 that lies to be directed to the back panel 13. The light of the blue wavelength range that is reflected by the second reflecting mirror 145 is transmitted through the second dichroic mirror 148 by way of the collective lens 147 and is then incident on the collective lens 173. The pencils of red, green and blue light that are guided by the light guiding system 140 in the way described above are guided on to the same optical path of a light source-side optical system 170.

The light source-side optical system 170 includes the collective lens 173, a light guiding device 175 such as a light tunnel or a glass rod, a collective lens 178, a light axis turning mirror 179, a collective lens 183, a shining mirror 185, and a condenser lens 195. The condenser lens 195 emits image light that is emitted from the display device 51 that is disposed on a side of the condenser lens 195 that lies to be directed to the back panel 13 towards a projection-side optical system 220, and therefore, the condenser lens 195 constitutes part of the projection-side optical system 220.

Pencils of light emitted from the collective lens 173 are incident on the light guiding device 175. The pencils of light that enter the light guiding device 175 are transformed into pencils of light whose intensities are distributed uniformly by the light guiding device 175.

The light axis turning mirror 179 is disposed on an optical axis of the light guiding device 175 on a side thereof that lies to be directed to the back panel 13 via the collective lens 178. Pencils of light emerging from an emerging port of the light guiding device 175 are collected by the collective lens 178, whereafter axes of the pencils of light are turned to be directed towards the collective lens 183 by the light axis turning mirror 179.

The pencils of light that are reflected by the light axis turning mirror 179 are collected by the collective lens 183 and are then shined on to the display device 51 at a predetermined angle by way of the condenser lens 195 by the shining mirror 185. A heat sink 190 is provided on a side of the display device 51 that lies to be directed to the back panel 13. The display device 51, which is a DMD, is cooled by this heat sink 190. Plate surfaces of fins that are formed on a rear side of the heat sink 190 are formed perpendicular relative to the up-and-down direction.

The pencils of light, which are light source light, shined on an image forming plane of the display device 51 by the light source-side optical system 170 are reflected on the image forming plane of the display device 51 and are then projected on to a screen by way of the projection-side optical system 220 as projected light.

The projection-side optical system 220 is made up of the condenser lens 195, the movable lens group 235 and a fixed lens group 225. The fixed lens group 225 is incorporated in a fixed lens barrel. The movable lens group 235 is incorporated in a movable lens barrel so as to be moved manually or automatically for zooming and focusing.

By configuring the projector 10 in the way described heretofore, when the luminescent plate 101 is rotated and lights are emitted from the excitation light shining device 70 and the red light source device 120 at different timings, lights of the red, green and blue wavelength ranges are incident on the light guiding system 175 by way of the light guiding optical system 140 and are then incident on the display device 51 by way of the light source-side optical system 170. Thus, the display device 51, which is the DMD, of the projector 10 displays the red, green and blue lights in a time sharing fashion according to data, whereby a color image can be projected on to the screen.

Figure 5:
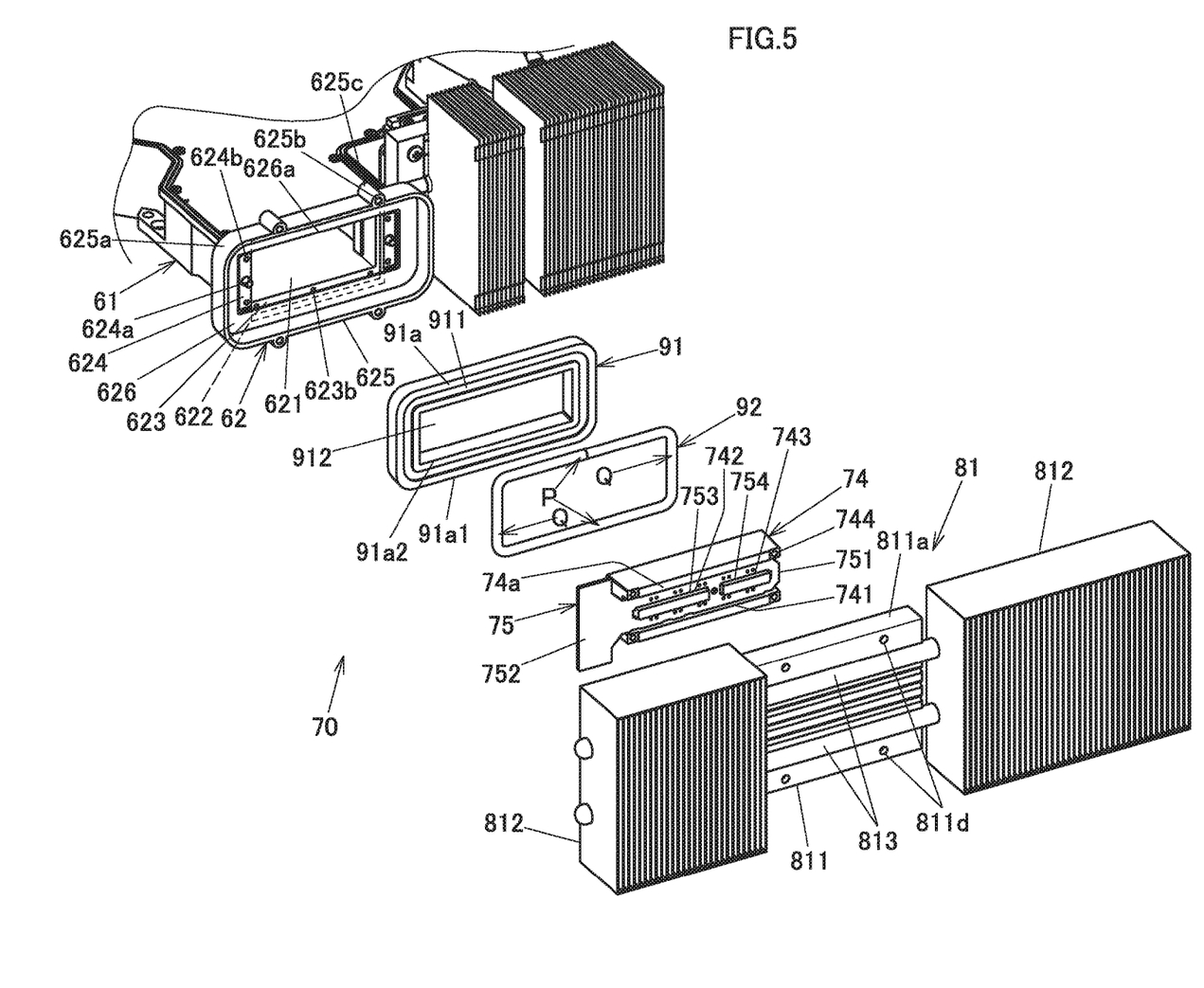
FIG. 5 is an exploded perspective view of an excitation light shining device according to the first embodiment of the invention.
Figure 6:
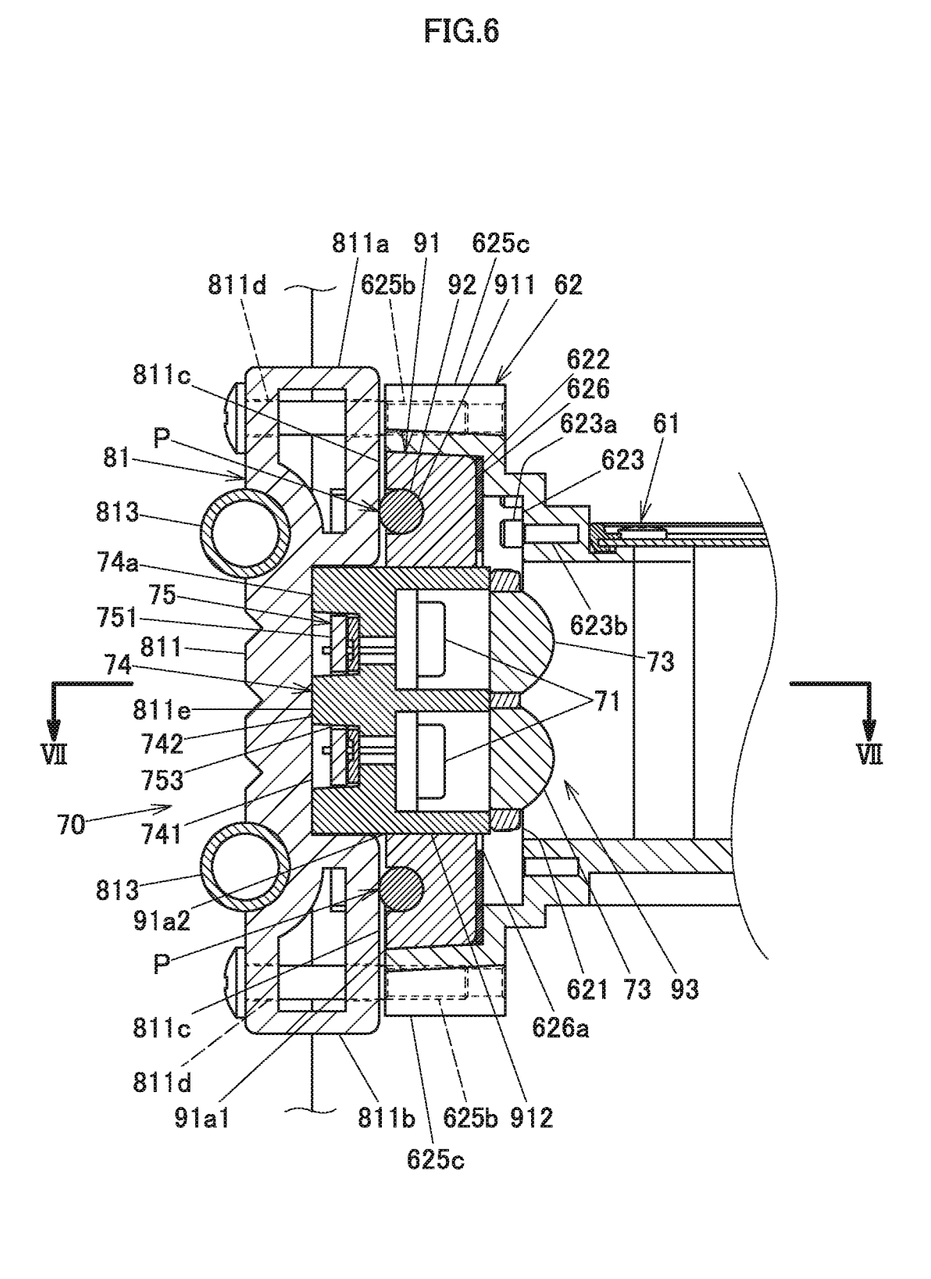
FIG. 6 is a sectional view of a circumference of the excitation light shining device of the light source unit according to the first embodiment of the invention taken along a line VI-VI shown in FIG. 3.
Figure 7:
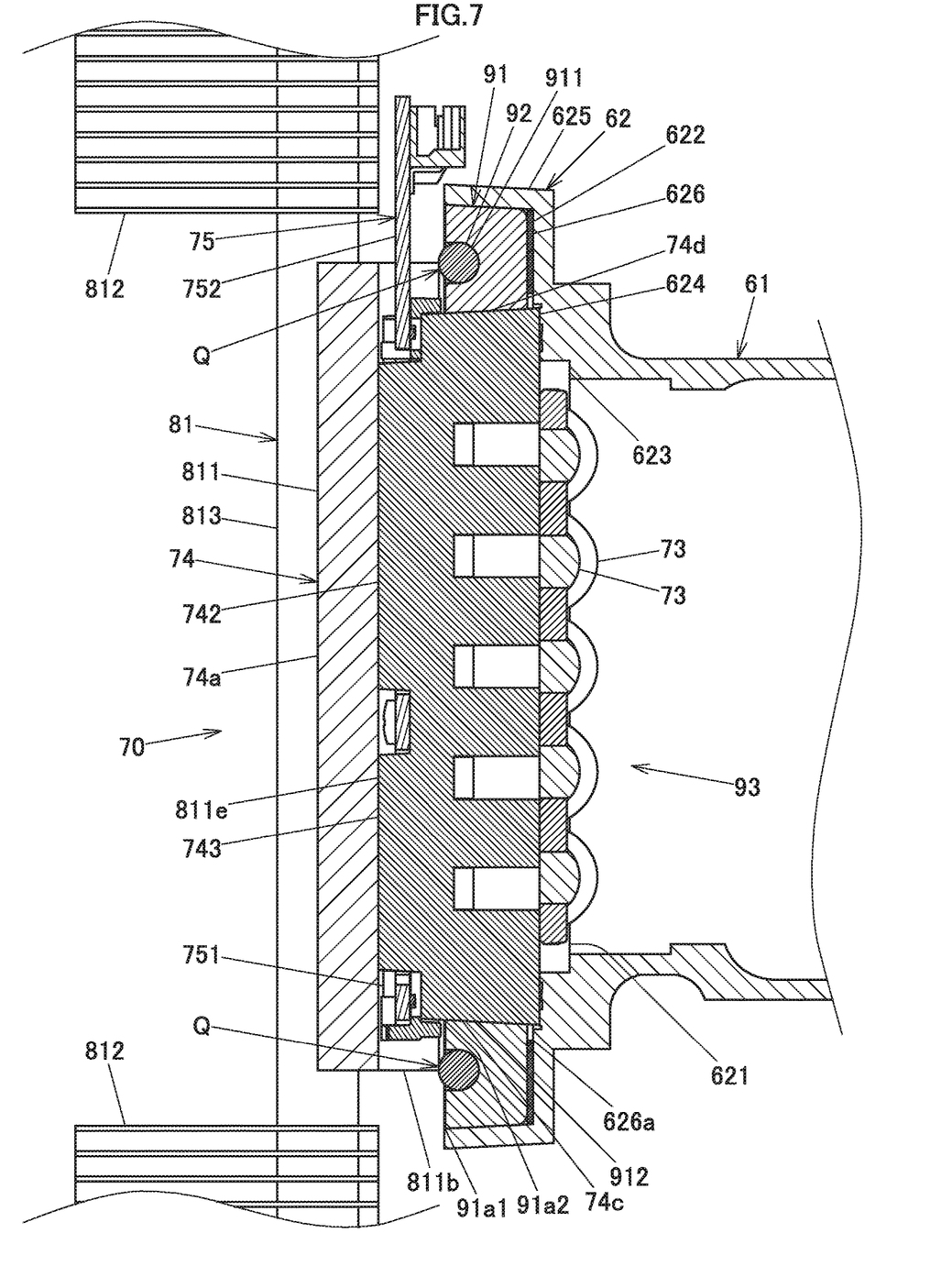
FIG. 7 is a sectional view of the circumference of the excitation light shining device of the light source unit according to the first embodiment of the invention taken along a line VII-VII shown in FIG. 6.

Next, the configuration of the excitation light shining device 70 will be described. FIG. 5 is an exploded perspective view of the heat sink 81 of the excitation light shining device 70, the holder 74 that is a fixing target member, a packing 91 and a core member 92. FIG. 6 is a sectional view of a circumference of the excitation light shining device 70 taken along a line VI-VI shown in FIG. 3. FIG. 7 is a sectional view of the circumference of the excitation light shining device 70 taken along a line VII-VII shown in FIG. 6. In the following description of the excitation light shining device 70, a side of the excitation light shining device 70 that lies to be directed to the light source unit will be described as a front and a side of the excitation light shining device 70 that lies to be directed to the heat sink 81 will be described as a rear thereof.

The heat sink 81 has a base member 811 and fin units 812 each made up of a plurality of fins. The base member 811 is formed into a substantially rectangular plate. As shown in FIG. 6, the base member 811 has fastening blocks 811a, 811b that are erected towards the light source case 61 from an upper end portion and a lower end portion thereof. The base member 811 has two screw through holes 811d on each of an upper end side and a lower end side thereof. The fastening blocks 811a, 811b each have a hollow construction that penetrates therethrough in a left-and-right direction. Abutment surfaces 811c of the fastening blocks 811a, 811b that lie to face a fixing portion 62 are formed as flat surfaces.

In FIG. 5, the base member 811 and the fins of the fin units 812 are connected together by two heat pipes 813. The base member 811 and the heat pipes 813 are secured to each other through brazing so that heat can be conducted therebetween. The fin units 812 are disposed on both ends of the base member 811.

The holder 74 has a substantially parallelepiped shape. The holder 74 has a groove 741 that is formed so as to extend in a longitudinal direction on a side that faces the heat sink 81. Two middle walls 742, 743 are formed substantially at a center of the groove 741 so as to extend in the longitudinal direction similarly. The middle walls 742, 743 are provided parallel in the longitudinal direction. A surface 74a of the holder 74 on the side where the groove 741 is formed that include the middle walls 742, 743 is formed substantially on the same flat plane (refer to FIGS. 6 and 7).

A circuit board 75 is disposed in the groove 741 of the holder 74. The circuit board 75 has a substantially rectangular shape having its major axis in the same direction as the longitudinal direction of the holder 74. The circuit board 75 has a wiring portion 751 that supplies electric power to the blue laser diodes 71 and a connecting portion (a projecting portion) 752 that is connected with a power supply and the control circuit. The wiring portion 751 is formed narrower than the connecting portion 752. Two through holes 753, 754 are formed in the wiring portion 751 so as to extend in a longitudinal direction of the circuit board 75. The middle wall 742 is inserted in the through hole 753, and the middle wall 743 is inserted in the through hole 754, whereby the wiring portion 751 is disposed in the groove 741. Screw holes 744 are formed in four corners of the holder 74 so as to penetrate the holder 74 in a font-and-rear direction from a heat sink 81 side to a light source case 61 side of the holder 74.

Lateral end faces 74c, 74d of the holder 74 are formed into a tapered shape as a result of the heat sink 81 side being formed shorter than the light source case 61 side of the holder 74.

The packing 91 is formed of a soft elastic member of a silicone rubber into a substantially rectangular ring shape. A side of the packing 91 that faces the heat sink 81 is formed as a substantially flat surface 91a. A groove 911 is formed on the flat surface 91a. The groove 911 is disposed into a ring shape substantially at a center between an outer edge 91a1 and an inner edge 91a2 of the packing 91. The groove 911 has a substantially concave arc-like cross-sectional shape. An opening portion 912 formed inside the packing 91 has a substantially rectangular shape whose inner corner portions are substantially a right angle. Corner portions of the outer edge 91a1 of the packing 91 are formed into an arc shape.

An outside diameter of a cross section of the core member 92 is substantially the same as an inside diameter of the groove 911 of the packing 91, and the core member 92 is formed into a substantially elongated rectangular ring as a whole. The core member 92 has a substantially circular cross section. A hard member of metal (for example, stainless steel) is used for the core member 92. Specifically, the core member 92 is formed by bending a rod-like member into a substantially ring shape. Consequently, although the core member 92 is formed into the ring shape, a cut portion exists between one end and the other end of the core member 92.

The light source case 61 has the fixing portion 62 that is expanded into a flange-like shape. The fixing portion 62 constitutes a fixing position where the holder 74 and the heat sink 81 are mounted or fixed to the light source case 61. A substantially rectangular opening portion 621 is formed on a central side of the fixing portion 62. Spaces outside and inside of the light source case 61 are connected to each other through this opening portion 621. A flat surface portion 622 is formed around the opening portion 621 of the light source case 61. A step portion 623 is formed on the flat surface portion 622 so as to surround an edge portion of the opening portion 621. The step portion 623 is depressed into a substantially rectangular shape around the circumferential portion of the opening portion 621.

A positioning projection 623a is formed on a portion of the step portion 623 that lies on an upper longitudinal side of the opening portion 621 (refer to FIG. 6). Additionally, three screw holes 623b are formed in each of portions of the step portion 623 that lie on the upper and lower longitudinal sides of the opening portion 621.

A substantially rectangular step portion 624 is formed on each of short or lateral sides of the opening portion 621. The step portion 624 is higher than a bottom surface of the step portion 623 and lower than the flat surface portion 622. A positioning engaging portion 624a, which is a projection, and two screw holes 624b are formed on each of the step portions 624.

A substantially rectangular frame portion 625 is formed on the fixing portion 62 so as to be erected from the flat surface portion 622. The frame portion 625 is provided on an outer circumferential perimeter of the opening portion 621 so as to surround the opening portion 621. Corner portions 625a of the frame portion 625 are each formed into a substantially arc shape. Two arc-shaped protuberant portions 625c are formed on each of an upper side and a lower side that constitute longer sides of the frame portion 625. A screw hole 625b is formed in each of the protuberant portions 625c.

A damper member 626 in the form of a thin plate is disposed on the flat surface portion 622 inside the frame portion 625. The damper member 626 has a rectangular opening portion 626a whose bore diameter is slightly greater than that of the opening portion 912 in a position corresponding to the opening portion 912. The damper member 626 is formed so as to cover most of the step portion 623 (refer to FIGS. 5 and 6) and is formed so as to expose most of the step portion 624 (refer to FIGS. 5 and 7). The damper member 626 is disposed so as to be held by the flat portion 622 and the packing 91 with the excitation light shining device 70 assembled as shown in FIGS. 6 and 7.

Next, an assembling method of the excitation light shining device 70 will be described. Firstly, the holder 74 including the circuit board 75, the packing 91 and the core member 92 are assembled together to fabricate a temporary assembly 93. In relation to the temporary assembly 93, firstly, the core member 92 is disposed within the groove 911 formed on the packing 91. Thereafter, the holder 74 on which the blue laser diodes 71 and the collimator lenses 73 are fixed in place is fitted in a front side (a side where the light source case 61 is disposed) of the opening portion 912 of the packing 91. The core member 92 may be disposed in the groove 911 after the holder 74 has been fitted in the opening portion 912.

After the holder 74, the packing 91 and the core member 92 are assembled into the temporary assembly, the circuit board 75 is fixed to the holder 74, and circuits on the circuit board 75 are connected electrically with the corresponding laser diodes 71. The temporary assembly 93 of the holder 74, the packing 91 and the core member 92 is inserted into the frame portion 625 in which the damper member 626 is disposed on the flat surface portion 622. As this occurs, since a slight clearance is defined between the outer surface of the packing 91 and an inner surface of the frame, the temporary assembly 93 is disposed easily within the frame portion 625. Additionally, the temporary assembly 93 is temporarily fixed in place within the frame portion 625 by the tapered outer surface of the packing 91. The positioning engaging portion 624a, which is the projection, is inserted into a positioning engaged portion, which is a hole portion, not shown, provided on a side of the holder 74 that lies to face the fixing portion 62, whereby the temporary assembly 93 is restricted from moving in a direction perpendicular to a mounting direction of the holder 74. The positioning engaged portion may be formed as a projection, and the positioning engaging portion 624a may be formed as a hole portion.

Thereafter, as shown in FIG. 6, the base member 811 of the heat sink 81 is assembled to the fixing portion 62 side so as to cover the holder 74 from the rear thereof. Fixing screws are screwed into the screw holes 625b via the screw through holes 811d, whereby the base member 811 is fixed to the fixing portion 62.

When the base member 811 is so fixed, the abutment surface 811c on the fixing portion 62 side of the base member 811 is brought into abutment with the core member 92 to thereby press the core member 92 towards the packing 91. Due to this, the base member 811 of the heat sink 81 functions as a pressing member. The base member 811 of this embodiment presses an upper and lower side portions P of the core member 92 that faces vertically (refer to FIGS. 5 and 6) but does not press lateral side portions Q of the core member 92 that faces horizontally (refer to FIGS. 5 and 7).

Namely, the connecting portion 752 of the circuit board 75 that is disposed in the groove 741 of the holder 74 does not exist in a position that corresponds to the holder 74. Thus, since the connecting portion 752 of the circuit board 75 protrudes from the holder 74, the core member 92 is never brought into contact with the base member 811 of the heat sink 81, whereby the core member 92 is not pressed by the heat sink 81. Since the cut portion exists between the one end and the other end of the core member 92 that is formed substantially into the ring shape, the cut portion between the one end and the other end of the core member 92 is disposed so as to be located near a center of the longer or longitudinal side of the core member 92 and is not disposed on the lateral sides of the core member 92 that are located on the shorter or lateral sides thereof so that the substantially ring-shaped member that is cut can be pressed uniformly by the pressing member.

In this way, the circuit board 75 is mounted on the holder 74 and has the connecting portion 752. Additionally, the cut portion between the one end and the other end of the core member 92 is disposed near the center of one of the portions of the core member 92 that face each other vertically. Consequently, the facing portions of the core member 92 that are pressed by the heat sink 81 constitute an area of the circuit board 75 that excludes the connecting portion 752. When pressed by the core member 92, the packing 91 is deformed in such a way that the packing 91 is expanded in width inwardly and outwardly from the portion where the groove 911 is formed. Consequently, the gap between the inner circumferential surface of the packing 91 and the outer surface of the holder 74 is sealed up, and a gap between an outer circumferential surface of the packing 91 and an inner circumferential surface of the frame portion 625 is also sealed up. This enables the excitation light shining device 70 of this embodiment to have a high dust-proof performance relative to the outside and inside of the light source case 61.

When the base member 811 is fixed to the fixing portion 62 so as to cover the holder 74, a flat surface portion 811e of the base member 811 that faces the holder 74 is brought into substantially face-to-face abutment with a front surface 74a of the holder 74. Due to this, heat generated mainly from the blue laser diodes 71, which constitutes the light sources, is transferred to the base member 811 by way of the holder 74, whereby the excitation light shining device 70 is cooled by the heat sink 81.

Second Embodiment

Figure 8:
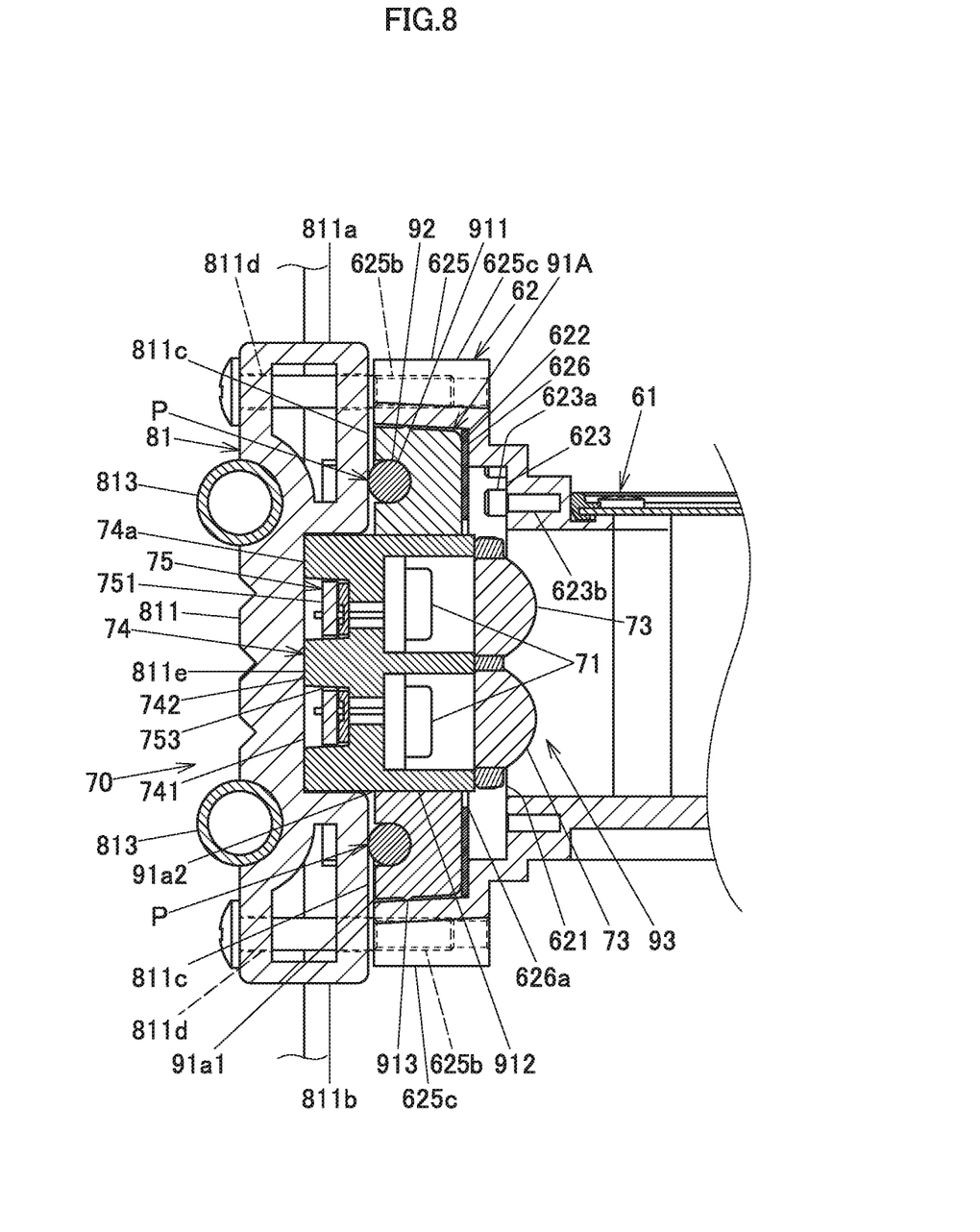
FIG. 8 is a sectional view corresponding to the sectional view of the circumference of the excitation light shining device taken along the line VI-VI shown in FIG. 3, illustrating a case where a packing according to a second embodiment of the invention is used.

Next, a second embodiment will be described. FIG. 8 is a drawing showing a case where a packing 91A is applied to a sealing construction of an excitation light shining device 70. In the second embodiment, the packing 91A is used in place of the packing 91 of the first embodiment. In the description of the packing 91A of this embodiment, like reference numerals will be given to configurations like to those of the packing 91, and the description there of will be omitted or simplified.

The packing 91A has a projection 913 that is formed along a full circumference of an outer circumferential surface thereof. As shown in FIG. 8, the projection 913 has a substantially arc-shaped cross section. A contact portion of the packing 91A with an inner circumferential surface of a frame portion 625 is formed into a linear shape by the projection 913.

Consequently, when compared with the packing 91 on which the projection 913 is not formed, the packing 91A can reduce the degree of adhesion of the outer circumferential surface of the packing 91A to the inner surface of the frame portion 625 while ensuring the required dust-proof performance, enabling a holder 74 to be removed easily from an inside of the frame portion 625.

Third Embodiment

Figure 9:
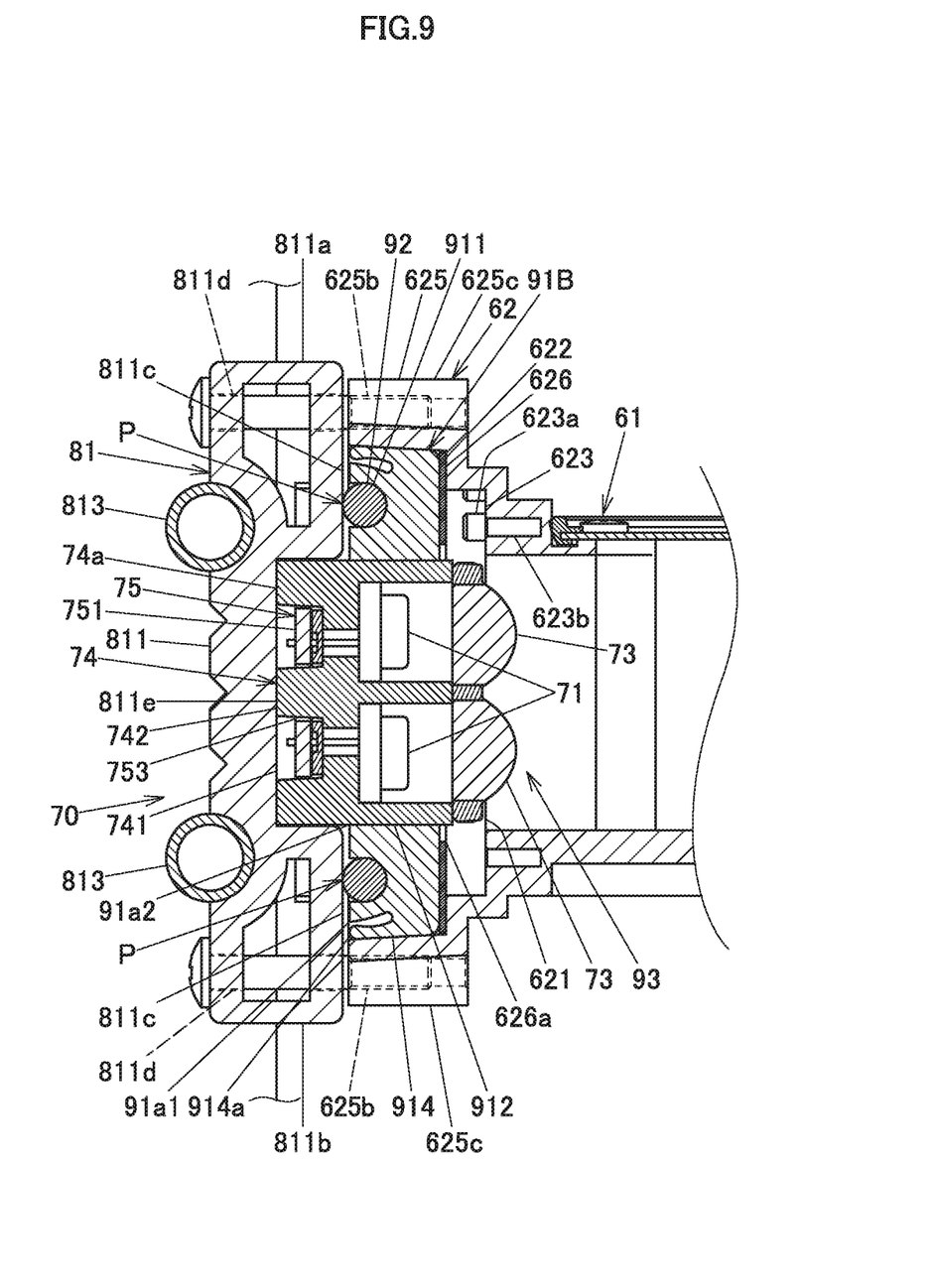
FIG. 9 is a sectional view corresponding to the sectional view of the circumference of the excitation light shining device taken along the line VI-VI shown in FIG. 3, illustrating a case where a packing according to a third embodiment of the invention is used.

Next, a third embodiment will be described. FIG. 9 is a drawing showing a case where a packing 91B is applied to a sealing construction of an excitation light shining device 70. In the third embodiment, the packing 91B is used in place of the packing 91 of the first embodiment. In the description of the packing 91B shown in FIG. 9, like reference numerals will be given to configurations like to those of the packing 91, and the description thereof will be omitted or simplified.

The packing 91B has a projection 914 that is formed along a full circumference of an outer circumferential surface thereof. The projection 914 is supported in a cantilever-like fashion from a fixing portion 62 side of a light source case 61 towards a base member 811 to thereby be erected into a tongue-like configuration. An outer surface of the projection 914 can be deformed easily towards a groove 911 and is brought into abutment with an inner circumferential surface of a frame portion 625 by virtue of a spring-back force that attempts to move the projection 914 away from the groove 911. Due to this, a gap between the packing 91B and the inner circumferential surface of the frame portion 625 is sealed up.

Consequently, when compared with the packing 91 on which the projection 914 is not formed, the packing 91B can enables a holder 75 to be removed from an inside of the frame portion 625 while ensuring the required dust-proof performance.

Thus, while the embodiments of the invention have been described heretofore, the invention is not limited to those embodiments. Thus, a rectangular or concave arc-shaped cut-out may be provided on part of the straight-line portion of the groove 911 provided on the packing 91. By adopting this configuration, the core member 92 can easily be removed from the packing 91, whereby the pressure that expands the width of the packing 91 can easily be released before the holder 74 is removed from the frame portion 625, thereby facilitating the removal of the holder 74 from the frame portion 625.

In the embodiments that have been described heretofore, the holder 74 is described as being the fixing target member. However, the invention is not limited thereto, and hence, the holder 74 may be made up of another member, provided that the member needs to be fixed from outside and has a construction in which the member needs to be sealed up from inside and outside. For example, in FIG. 3, the fixing target member can be the red light source 121 of the red light source device 120 or the heat sink 190.

The fixing method of the fixing target member described in the embodiments can be applied not only to the light source unit 60 but also to an electronic device of electronic equipment or a precision machine that requires a shielding construction to seal up an interior of a case against dust, drip and water. The fixing target member can be a member that needs to be fixed to such an electronic device from outside and that needs to be sealed up from inside and outside relative to the fixing portion.

In the embodiments that have been described heretofore, the base member 811 of the heat sink 81 is described as being used as the pressing member. However, the invention is not limited thereto, and hence, a different member from the heat sink 81 may be used as the pressing member, provided that the member can press the core member 92.

In the embodiments that have been described heretofore, as shown in FIG. 7, the holder 74 is described as being formed into the tapered configuration in which the portion that faces the heat sink 81 is shorter than the portion that faces the fixing portion 62. However, the invention is not limited thereto, and hence, the holder 74 may be formed into a tapered configuration in which the portion that faces the heat sink 81 is longer than the portion that faces the fixing portion 62 or into a configuration in which the holder 74 is not tapered in any way. As this occurs, the holder 74 may be inserted into the opening portion 912 so as to be mounted in place therein after the packing 91 is inserted into the frame portion 625 of the fixing portion 62.

In addition, the packing 91 and the core member 92 may be formed into an integral part that is formed through multi-color molding or the like. By adopting this configuration, when the holder 74 is fixed to the fixing portion 62 or is removed from the fixing portion, a step of fixing to or removing from the packing 91 can be omitted.

The pressing member such as the base member 811 may be configured to press part or the whole of the sides that face the core member 92 or may be configured to press the diagonal portions of the core member 92.

Thus, as has been described heretofore, the light source unit 60 of the invention includes the fixing target member (the holder 74), the fixing portion 62 having formed thereon the frame portion 625 that is erected around the circumference of the fixing target member, the packing 91 that is disposed between the frame portion 625 and the fixing target member, the core member 92 that is disposed in the groove 911 that is formed on the packing 91, and the pressing member (the heat sink 81) that presses the core member 92 towards the packing 91 to expand the packing 91 widthwise.

By adopting this configuration, the lateral pressure can be applied to the direction that is substantially perpendicular to the mounting direction of the fixing target member to seal up the gap between the fixing target member and the fixing member 62, whereby the load exerted in the mounting direction of the fixing target member can be reduced. The sealing construction employing the lateral pressure can realize the hermetically closed construction even in a case where the holder 74 has only a small sitting surface relative to the fixing portion 62 in the mounting direction. Additionally, the sealing construction employing the lateral pressure can reduce a sitting failure in relation to the mounting direction that would otherwise be caused by the repulsion force of the packing 91. In this way, it is possible to provide the electronic device that improves the dust-proof performance while reducing the positional deviation of the fixing target member, the light source unit including this electronic device and the projector including this light source unit.

According to the electronic device in which the packing 91 is formed into the ring shape that surrounds the lateral sides of the fixing target member, the dust-proof sealing construction can be formed along the full circumference of the outer circumferential surface of the fixing target member.

According to the electronic device in which the groove 911 is formed into the ring shape in the position between the inner circumference and the outer circumference of the packing 91, and the core member 92 is formed into the ring shape, once part of the core member 92 is pressed, the whole of the core member 92 can be loaded with the pressure that forces the core member 92 towards the packing 91.

According to the electronic device in which the pressing member presses the portions of the core member 92 that face each other, the groove can be pressed uniformly without pressing the whole of the core member 92.

According to the electronic device in which the packing 91A or 91B has the projection 913 or 914 that extends along the full circumference of the outer circumferential surface thereof, the adhesion of the outer circumferential surface of the packing 91A or 91B to the inner surface of the frame portion 625 can be reduced while ensuring the dust-proof performance, whereby the holder 74 can be removed easily from the interior of the frame portion 625.

According to the electronic device in which the projection 914 extends into the tongue-like shape from the side of the packing 91B that faces the fixing portion 62 to the side of the packing 91B that faces the pressing member, the holder 74 can easily be removed from the interior of the frame portion 625 while ensuring the dust-proof performance. In addition, since the projection 914 is formed into the tongue-like shape, the projection 914 can have a wide moving area, whereby the following performance of the projection 914 relative to the irregularities on the inner circumferential surface of the frame portion 625 can be improved to thereby improve the dust-proof performance of the packing 91B.

According to the electronic device in which the groove 911 has the concave arc-shaped cross section and the core member 92 has the circular cross section, since the adhesion of the packing 91 to the core member 92 can be enhanced, the pressure exerted on the core member 92 can be transformed efficiently into the pressure that is exerted on the packing 91 to expand the packing 91 widthwise.

According to the electronic device in which the fixing portion 62 has the positioning engaging portion, and the fixing target member has the positioning engaged portion that allows the positioning engaging portion is brought into engagement therewith, the risk of the fixing target member deviating from the predetermined position can be reduced by disposing the packing 91.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made thereto without departing from the spirit and scope of the invention. Those resulting embodiments and their modifications are included in the spirit and scope of the invention and are also included in the scope of inventions claimed for patent under claims below and their equivalents.

What is claimed is:

1. An electronic device comprising:
a fixing target member which is a holder that holds a light source;
a fixing portion having formed thereon a frame portion that is erected around a circumference of the fixing target member;
a packing configured to be disposed between the frame portion and the fixing target member and formed into a ring shape that surrounds lateral sides of the fixing target member, and having a groove formed into a ring shape in a position between an inner circumference and an outer circumference of the packing;
a core member configured to be disposed in the groove and be formed into a ring shape; and
a pressing member configured to press the core member towards the packing.

2. The electronic device according to claim 1, wherein the pressing member presses portions of the core member that face each other.

3. The electronic device according to claim 2, comprising:
a circuit board mounted on the fixing target member and having a projecting portion,
wherein the core member has a cut portion between one end and the other end thereof,
wherein the cut portion of the core member is disposed near a center of one of the facing portions of the core member, and
wherein the facing portions of the core member that the pressing member presses constitute an area excluding a portion that corresponds to the projecting portion of the circuit board.

4. The electronic device according to claim 3,
wherein the packing has a projection that extends along a full circumference of an outer circumferential surface thereof.

5. The electronic device according to claim 4,
wherein the projection extends into a tongue-like shape from a side that lies to face the fixing portion to a side that lies to face the pressing member.

6. The electronic device according to claim 2,
wherein the packing has a projection that extends along a full circumference of an outer circumferential surface thereof.

7. The electronic device according to claim 6,
wherein the projection extends into a tongue-like shape from a side that lies to face the fixing portion to a side that lies to face the pressing member.

8. The electronic device according to claim 2,
wherein the groove has a concave arc-shaped cross section, and
wherein the core member has a circular cross section.

9. The electronic device according to claim 1,
wherein the packing has a projection that extends along a full circumference of an outer circumferential surface thereof.

10. The electronic device according to claim 9,
wherein the projection extends into a tongue-like shape from a side that lies to face the fixing portion to a side that lies to face the pressing member.

11. The electronic device according to claim 1,
wherein the groove has a concave arc-shaped cross section, and
wherein the core member has a circular cross section.

12. The electronic device according to claim 1,
wherein the fixing portion has a positioning engaging portion, and
wherein the fixing target member has a positioning engaged portion that allows the positioning engaging portion to be brought into engagement therewith to position the fixing portion in a direction that is perpendicular to a mounting direction.

13. A light source unit comprising:
the electronic device according to claim 1,
wherein the fixing portion is provided in a light source case in which an opening portion is formed in a fixing position, and
wherein the pressing member is a heat sink for the holder that is brought into abutment with the holder while pressing the core member.

14. A projector comprising:
the light source unit according to claim 13;
a display device on to which light source light from the light source unit is shined to form image light;
a projection-side optical system configured to project the image light emitted from the display device on to a screen; and a projector control unit configured to control the display device and the light source unit.

\* \* \* \* \*